Jan. 5, 1926.

W. SPARKS

FAN

Filed Oct. 4, 1921

1,568,780

Inventor
Wm Sparks
By
Denison Thompson
Attorneys

Patented Jan. 5, 1926.

1,568,780

UNITED STATES PATENT OFFICE.

WILLIAM SPARKS, OF JACKSON, MICHIGAN, ASSIGNOR TO THE SPARKS-WITHINGTON COMPANY, OF CLEVELAND, OHIO, A CORPORATION OF OHIO.

FAN.

Application filed October 4, 1921. Serial No. 505,340.

*To all whom it may concern:*

Be it known that I, WILLIAM SPARKS, a citizen of the United States, of Jackson, in the county of Jackson, in the State of Michigan, have invented new and useful Improvements in Fans, of which the following, taken in connection with the accompanying drawings, is a full, clear, and exact description.

This invention relates to certain improvements in fans.

The object of the invention is to construct a fan preferably of a plain bearing type that is effectively lubricated by a contained lubricating system, the circulation of lubricant through which is maintained by the operation of the fan.

Other objects and advantages relate to the details of construction and form of the parts, all as will more fully appear from the following description, taken in connection with the accompanying drawings, in which:—

Figures 1, 2:
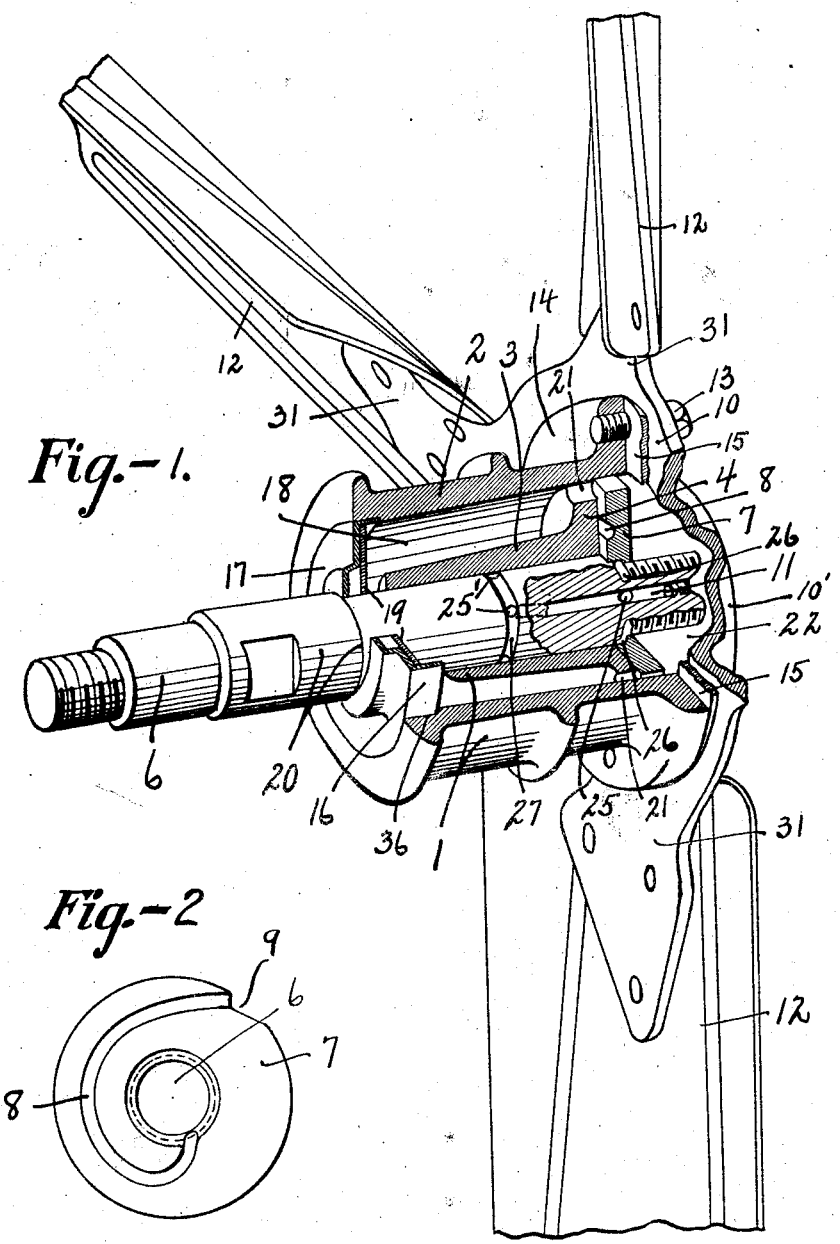
Figure 1 is an elevation partly in section of a fan including my invention.
Figure 2 is an elevation of the thrust washer used in connection with this construction of fan.

The fan structure illustrated in the drawings is closely related to the structure described and claimed in my copending application Serial No. 505,337, filed at even date herewith and which application contains the broad claims to subject matter common to these two applications.

This fan structure comprises a casting —1— comprising a pair of substantially cylindrical concentric parts —2— and —3— connected by an integral cross wall —4— spaced a short distance from one end of the part —2—, which latter part may, as indicated, constitute the pulley portion of the fan, while the part —3— constitutes the main bearing for the fan. The cross-wall —4— is provided with a plurality of openings or holes drilled therethrough and permitting the passage of liquid from the oiling chamber —18— formed between the parts —2— and —3— and the forward portion of the fan structure as hereinafter described.

As stated, the part —3— constitutes the main bearing of the fan and it is mounted for rotary movement upon the shaft —6—, which may constitute the support for the fan construction. The shaft —6— is provided with a thrust washer —7— preferably mounted thereon in a manner to maintain a position near the forward end of the shaft, and as illustrated, the forward end of the shaft is reduced and threaded for the reception of the thrust washer, which is internally threaded for co-action therewith and adapted when in its desired position to abut against the enlarged or flanged portion of the shaft, so as to be maintained in desired position, the fan being designed for rotation in a direction to maintain the thrust washer against the flange upon the shaft. The thrust washer —7— is of an external diameter slightly less than the internal diameter of the part —2—, and is designed to be positioned within the said part —2—, and has its thrust surface bearing against the cross wall —4—. The thrust surface of the washer —7— is provided, as best shown, in Figure 2 with a spiral or helical groove —8— leading from a point adjacent the shaft —6— to the edge of the washer.

Communication between the groove —8— and the chamber —22— between the thrust washer —7— and the fan spider —10— is effected through notch —9— in the edge of the thrust washer and the lubricant is fed from groove —8— to groove —26— and through openings —25— to the passageway —11— drilled or otherwise formed in the shaft —6—, and which extends from the end of the shaft which terminates in the chamber —22— along the shaft a sufficient distance to supply lubricant to the bearing portion —3— of the casting. This is perhaps preferably effected by forming the shaft —6— with a pair of grooves —26— and —27— respectively, which grooves are in communication with the longitudinal passage-way —11— through one or more openings or conduits —25— and —25'— respectively drilled or otherwise formed in the shaft.

The annular groove —26— is formed at a point adjacent the meeting surfaces of the cross-wall —4— and the thrust washer —7— so as to receive lubricant from the spiral or helical groove —8— to lubricate the bearing and supply lubricant to the annular groove —27— through passageway —11— from which the lubricant is ultimately returned to chamber —18—. The fan spider —10— may, as indicated, have a forwardly off-set portion —10'— and a series of radiating arms —31— on which the fan blades may be mounted in any suitable manner. The fan spider —10— is connected to the casting —1— in any suitable manner, as by bolts —13— extending through the fan spider, through the flange —14— upon casting —1— and through an interposed washer —15— to form an oil-tight joint between the casting —1— and the fan spider —10—.

The rear end of the casting —1— is bored out at —36— for the reception of the flange —16— constituting a portion of a pressed metal cup —17— of such a diameter that the cup —17— when pressed within the bored out portion of the part —1— is frictionally held therein in desired position. This cup has a central opening through which the shaft —6— extends and the opening is of such a size as to prevent the escape of lubricant from the oil chamber —18—.

As an additional barrier, a washer —19— is provided adapted to fit tightly within the cup —17— and as indicated, spaced therefrom at its inner edge due to the dished shape of the cup —17— so as to form between the cup-shaped member and the washer an annular chamber capable of receiving a ring of suitable material, such as cork, should that be desirable for any purpose, such as shipment of the article.

The inner surface of the washer —19— is spaced some distance from the rear end of the bearing —3— so that all of the rear end of the bearing has a clear opening into the oil chamber —18— and can, therefore, take care of any amount of oil which may leak out as the bearing becomes worn. The end of the conduit —11— opening into the chamber 22 is closed by a plug which may be a screw plug if desired, which cuts off direct communication between chamber —22— and conduit —11—.

The thrust ahead is taken between washer —7— and wall —4— while the thrust back is taken between the end of the shaft and the fan spider, the end of the shaft being at all times in substantial contact with the interior surface of the fan spider.

The operation of this structure will be readily understood. The lubricant contained in chamber —18— flows through the opening —21— and escapes forward around the outer edge of the thrust washer —7— into chamber —22— between the thrust washer —7— and the fan spider —10—. When the fan is revolving, the oil is thrown around and past the periphery of the thrust washer —7— which is of slightly smaller diameter than the bore of the casting part —2— within which it turns. The notch —9— in washer —7— scoops up the oil and starts it flowing around oil groove —8— and due to this scooping action plus the action caused by one side of the groove —8— moving and the other side standing still, the oil is caused to flow toward the center of the shaft —6— passing through openings herein described. The lubricant is then forced through conduit —11— out openings —25'— into groove —27— thus to the bearing surface between shaft —6— and casting —3— and all lubricant escaping out of the rear end of this bearing is thrown back into chamber —18— for re-circulation.

It will be noted that this structure does not depend entirely upon the centrifugal force of the oil striking the notch —9— and oil groove —8— to produce the pressure for circulating the oil for the reason that in connection with both the oiling thrust washer —7— and the bearing surface —3—, one wall of the conduit through which the oil passes is stationary and the other will is movable. This relative movement causes the oil to move in the manner described.

It will be noted that with this system of lubrication not only the bearing surface —3— but the thrust surface of the washer —7— is positively and effectively lubricated.

Any suitable means may be provided for filling the chamber 18, as for instance, the usual opening with a closure plug not necessary to herein further illustrate or describe, as the structure of the same constitutes no portion of this invention.

Although I have shown and described a specific construction and form of device, as illustrative of a perhaps preferred embodiment of my invention, I do not desire to limit myself to the same, as various changes, modifications and substitutions may be made without departing from the invention, as set forth in the appended claims.

I claim:—

1. A fan structure comprising a shaft, an elongated bearing mounted thereon, a casing enclosing the bearing and extending beyond the bearing at its front end, a cross wall connecting the bearing to the casing at the forward end of the bearing thereby forming an annular oil chamber between the bearing and the casing, said cross-wall provided with an opening for the passage of lubricant, a thrust washer mounted on said shaft and having its thrust surface in contact with said cross wall, a fan spider secured to the forward end of said casing and forming a second lubricant chamber between the fan spider and the thrust washer, said thrust washer having a recess in its periphery and a groove in its thrust surface leading to the shaft, said shaft having a longitudinally extending conduit and radially extending conduits extending from the longitudinal conduit to the periphery of the shaft.

2. A fan structure comprising a shaft, an elongated bearing mounted thereon, a casing enclosing the bearing and extending beyond the bearing at its front end, a cross wall connecting the bearing to the casing at the forward end of the bearing, thereby forming an annular oil chamber between the bearing and the casing, said cross-wall provided with an opening for the passage of lubricant, a thrust washer mounted on said shaft and having its thrust surface in contact with said cross wall, a fan spider secured to the forward end of said casing and forming a second lubricant chamber between the fan spider and the thrust washer, said thrust washer having a recess in its periphery and a groove in its thrust surface leading to the shaft, said shaft having a longitudinally extending conduit and radially extending conduits extending from the longitudinal conduit to the periphery of the shaft, and annular grooves in the periphery of the shaft in communication with the respective radial conduits, one of said annular grooves being in communication with the groove in the surface of the thrust washer and the other annular groove positioned at an intermediate point along the bore of said bearing.

3. A fan structure comprising an integral casting, including a substantially cylindrical bearing portion, a substantially cylindrical casing portion spaced from the bearing portion, a cross wall connecting the forward end of the bearing portion to the casing at an intermediate point along the length of the latter, a fan spider secured to the forward end of the casing and spaced from said cross wall, a shaft mounted in the bearing portion, a thrust washer mounted on said shaft between the fan spider and the cross wall and having its thrust surface in contact with the cross wall and its opposite surface spaced from the thrust washer to form a lubricant chamber, said thrust washer having a peripheral recess and a spiral groove leading from said recess to the shaft, said shaft formed with a longitudinally extending conduit and radial conduits leading therefrom to the periphery of the shaft, separate annular grooves in communication with the radial conduits, one of said annular grooves being positioned adjacent the thrust washer and the other positioned at an intermediate point along the bore of said bearing.

4. A fan structure comprising a shaft having a pair of circumferential grooves in its periphery, a bearing mounted on said shaft over one of said grooves, a thrust washer mounted on said shaft, adjacent the other groove, a longitudinal passageway within the shaft and opening into the said groove, and a groove in the surface of said thrust washer in communication with the adjacent groove in the shaft, and a notch in the periphery of said thrust washer forming a communication between the groove in the thrust washer and the chamber in front of the thrust washer.

5. A fan structure comprising a shaft, an elongated bearing mounted thereon, a casing enclosing the bearing and extending beyond the bearing at its front end and connected to the bearing for simultaneous rotation, an annular cross wall extending from the forward end of the bearing radially outwardly to the casing, thereby forming an annular oil chamber between the bearing and the casing, said cross wall provided with an opening for the passage of lubricant, a thrust washer mounted on said shaft and having its thrust surface in contact with the said cross wall, a fan spider secured to the forward end of said casing, said thrust washer having a recess in its periphery and a groove in its thrust surface for supplying lubricant to the shaft under pressure, and said shaft having a longitudinally extending conduit, a radial conduit leading from the longitudinal conduit to the surface of the shaft adjacent the thrust washer and an additional conduit leading from the longitudinally extending conduit to the interior of the elongated bearing.

6. A fan structure comprising a shaft, an elongated bearing mounted thereon, a casing enclosing the bearing and extending beyond the bearing at its front end and connected to the bearing for simultaneous rotation, an annular cross wall extending from the forward end of the bearing radially outwardly to the casing, thereby forming an annular oil chamber between the bearing and the casing, said cross wall provided with an opening for the passage of lubricant, a thrust washer mounted on said shaft and having its thrust surface in contact with the said cross wall, a fan spider secured to the forward end of said casing, said thrust washer having a recess in its periphery and a passageway leading from said recess to the shaft for supplying lubricant to the shaft under pressure, and said shaft having a longitudinally extending conduit, a radial conduit leading from the longitudinal conduit to the surface of the shaft adjacent the thrust washer and an additional conduit leading from the longitudinally extending conduit to the interior of the elongated bearing.

7. A fan structure comprising an integral casting including a substantially cylindrical elongated bearing portion, a substantially cylindrical elongated casing portion outside of and spaced from the bearing portion, a cross-wall connecting the forward end of the bearing portion to the casing at an intermediate point along the length of the latter, a shaft mounted in the bearing portion, a thrust washer mounted on said shaft and having its thrust surface in contact with said cross-wall, a fan spider secured to the forward end of said casing and spaced from the thrust-washer to form a lubricant chamber between the thrust washer and the fan spider, said thrust washer having a recess in its periphery permitting the passage of lubricant through the recess to the thrust surface of the thrust washer and said shaft having a longitudinally-extending conduit and radially extending conduits extending from the longitudinal conduit to the periphery of the shaft, one of said radially-extending conduits terminating near the thrust washer.

In witness whereof I have hereunto set my hand this 28th day of September, 1921.

WILLIAM SPARKS.